United States Patent
Choi

(10) Patent No.: US 11,994,741 B2
(45) Date of Patent: May 28, 2024

(54) LENS DRIVING DEVICE AND CAMERA MODULE INCLUDING SAME

(71) Applicant: LG INNOTEK CO., LTD., Seoul (KR)

(72) Inventor: Hyun Ho Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 743 days.

(21) Appl. No.: 17/044,200

(22) PCT Filed: Apr. 12, 2019

(86) PCT No.: PCT/KR2019/004465
§ 371 (c)(1),
(2) Date: Sep. 30, 2020

(87) PCT Pub. No.: WO2019/199130
PCT Pub. Date: Oct. 17, 2019

(65) Prior Publication Data
US 2021/0096321 A1 Apr. 1, 2021

(30) Foreign Application Priority Data
Apr. 12, 2018 (KR) .......................... 10-2018-0042775

(51) Int. Cl.
*G02B 7/09* (2021.01)
*G03B 5/00* (2021.01)

(52) U.S. Cl.
CPC ................. *G02B 7/09* (2013.01); *G03B 5/00* (2013.01); *G03B 2205/0046* (2013.01)

(58) Field of Classification Search
CPC . G02B 7/09; G02B 7/005; G02B 7/04; G02B 7/10; G02B 27/64; G02B 27/646;
(Continued)

(56) References Cited

U.S. PATENT DOCUMENTS 4,864,170 A * 9/1989 Eguchi ............... G11B 7/08582
5,305,151 A * 4/1994 Kakimoto ............ G11B 7/0933
(Continued)

FOREIGN PATENT DOCUMENTS

CN 101860167 A 10/2010
CN 103163623 A 6/2013
(Continued)

OTHER PUBLICATIONS

International Search Report in International Application No. PCT/KR2019/004465, filed Apr. 12, 2019.
(Continued)

*Primary Examiner* — Marin Pichler
(74) *Attorney, Agent, or Firm* — Saliwanchik, Lloyd & Eisenschenk

(57) ABSTRACT

One embodiment relates to a lens driving device and a camera module including same. The lens driving device according to the one embodiment can include: a base; a pin coupled to the base; and a housing including a lens group and moving in the optical axis direction along the pin. The housing can include, in one side thereof, a ball accommodation part and a plurality of balls arranged in the ball accommodation part. The pin is arranged in the ball accommodation part so as to be capable of guiding the housing while being in contact with the plurality of balls.

9 Claims, 12 Drawing Sheets

(58) Field of Classification Search
CPC ........ G02B 13/001; G02B 7/023; G02B 7/08;
G03B 5/00; G03B 5/02; G03B 13/34;
G03B 13/36; G03B 13/32; G03B
2205/0069; G03B 2205/0015; G03B
2205/0007; G03B 2205/0046; G03B
19/22; G03B 3/10; G03B 17/02; H04N
5/2328; H04N 5/2253; H04N 5/2254;
H05K 1/18; H02K 41/0354; H02K
41/0356
USPC ............... 359/822, 823, 824, 694, 696, 813;
396/89
See application file for complete search history.

(56) References Cited

U.S. PATENT DOCUMENTS

| | | |
|---|---|---|
| 8,014,658 B2 | 9/2011 | Huang |
| 2004/0207936 A1 | 10/2004 | Yamamoto et al. |
| 2011/0142434 A1 | 6/2011 | Schworm et al. |
| 2011/0236008 A1 | 9/2011 | Kang et al. |
| 2013/0083235 A1 | 4/2013 | Jacobsen et al. |
| 2013/0177301 A1 | 7/2013 | Nakayama et al. |
| 2015/0103195 A1 | 4/2015 | Kwon et al. |
| 2016/0178924 A1 | 6/2016 | Lim et al. |
| 2017/0090147 A1 | 3/2017 | Kim et al. |

FOREIGN PATENT DOCUMENTS

| | | |
|---|---|---|
| CN | 203133365 U | 8/2013 |
| CN | 105717725 A | 6/2016 |
| JP | 2011-59244 A | 3/2011 |
| JP | 2012-93558 A | 5/2012 |
| KR | 10-2011-0106664 A | 9/2011 |
| KR | 10-2012-0042386 A | 5/2012 |
| KR | 10-144807 B1 | 9/2014 |
| KR | 10-1440807 B1 | 9/2014 |
| KR | 10-2015-0101671 A | 9/2015 |
| KR | 10-2018-0004423 A | 1/2018 |

OTHER PUBLICATIONS

Office Action dated Aug. 31, 2021 in Chinese Application No. 201980025413.6.

* cited by examiner

LENS DRIVING DEVICE AND CAMERA MODULE INCLUDING SAME

CROSS-REFERENCE TO RELATED APPLICATIONS

This application is the U.S. national stage application of International Patent Application No. PCT/KR2019/004465, filed Apr. 12, 2019, which claims the benefit under 35 U.S.C. § 119 of Korean Application No. 10-2018-0042775, filed Apr. 12, 2018, the disclosures of each of which are incorporated herein by reference in their entirety.

TECHNICAL FIELD

Embodiments relate to a lens driving device and a camera module including the same.

BACKGROUND ART

The camera module captures a subject and stores it as an image or a video. The camera module is mounted on a mobile terminal such as a mobile phone, a laptop, a drone, or a vehicle.

On the other hand, portable devices such as smartphones, tablet PCs, and laptops have a small camera module, and the camera module has an autofocus function that aligns the focal length of the lens by automatically adjusting the distance between the image sensor and the lens.

Recently, the camera module can perform zooming by zooming in or zooming out of a remote object through a zoom lens. The demand for high magnification zooming more than twice that of camera modules is increasing.

On the other hand, friction torque is generated when the lens is moved by a mechanical movement using a lens driving device for a zooming function in the camera module. Technical problems such as a decrease in driving force, an increase in power consumption, or a decrease in control characteristics are caused by such friction torque.

In particular, in order to obtain the best optical characteristics in the camera module, the alignment between lenses must be well matched. However, when a decent in which the spherical center between the lenses deviates from the optical axis or a tilt, which is a lens inclination phenomenon, occurs, the angle of view changes or defocus occurs, which adversely affects image quality and resolution.

Meanwhile, in the camera module, the gap in the moving area may be increased to reduce friction torque resistance when the lens is moved for the zooming function. However, when the gap is increased, there is a technical contradiction in that a lens decent or a lens tilt occurs at a zoom movement or a zoom reverse movement.

In addition, since the compact camera module has a size limitation, there is a space limitation for zooming, which makes it difficult to implement the zooming function applied to a general large-scale camera. For example, as the height of the mobile phone becomes slim, there is a limitation of the lens thickness.

On the other hand, the contents described in the items just provide background information on the embodiments and do not constitute a prior art.

DISCLOSURE

Technical Problem

One of the technical problems of the embodiment is to provide a lens driving device and a camera module including the same, which can inhibit friction torque generation during lens movement through zooming in the camera module.

In addition, one of the technical problems of the embodiment is to provide a lens driving device and a camera module including the same that can inhibit the lens decenter or the lens tilt when moving the lens through the zooming in the camera module.

In addition, one of the technical problems of the embodiment is to provide a driving device and a camera module including the same, which can perform a zooming function smoothly even in a compact and compact camera module.

The technical problems of the embodiments are not limited to what was described in this section, it can be recognized from the description of this present invention.

Technical Solution

The lens driving device according to the embodiment includes a base 20; a pin 50 coupled to the base 20; and a housing 112 including a lens group and moving in the optical axis direction along the pin 50.

The housing 112 may include a ball accommodating part 115 and a plurality of balls 115b disposed in the ball accommodating part 115.

The pin 50 may be disposed in the ball accommodation part 115 to guide the housing 112 while contacting the plurality of balls 115b.

In addition, the plurality of balls 115b may be disposed to surround the pin 50.

Embodiments also include a magnet 116 disposed below the housing 112; a yoke 312 disposed to be spaced apart from the magnet 116; and a coil 314 disposed between the magnet 116 and the yoke 312.

In the Embodiments, there is attractive force between the yoke 312 and the magnet 116.

The ball accommodating part 115 may include a blocking part 115s for inhibiting movement between the plurality of balls 115b.

The ball accommodating part 115 may include a plurality of ball guide rails 115p between the plurality of balls 115b.

In embodiments, the ball guide groove 115r may be disposed between the ball guide rails 115p.

The ball guide groove 115r has an open area in the pin 51 direction, and the open diameter D3 of the open area may be smaller than the diameter D1 of the ball 115b.

In an embodiment, the ball accommodation part 115 may have an elliptical cross section, and the ball 115b may be disposed above and below the pin 51, respectively.

In an embodiment, the ball accommodation part 115 may include a second ball guide rail 115q, and the ball 115b may be disposed above and below the pin 51, respectively.

In an embodiment, the ball accommodation part 115 may have an elliptical cross section, and the ball 115b may be disposed above and below the pin 51, respectively. It may include a curved second recess 51r corresponding to the shape of the ball.

In an embodiment, the ball accommodation part 115 may be disposed below the lens unit 114.

The camera module according to the embodiment may include any one of the lens driving devices.

Advantageous Effects

The lens driving device and the camera module including the same according to the embodiment have a technical effect of solving the problem of friction torque generation during zooming.

For example, in the embodiment, the lens assembly is moved along the pin, while the ball accommodation part is provided inside the lens assembly so that the pin is in point contact with the ball, thereby minimizing friction torque. Accordingly, according to the embodiment, there are technical effects such as improvement in driving power, reduction in power consumption, and improvement in control characteristics.

In addition, according to the embodiment, there is a technical effect that can solve the problem of lens decenter or tilting during zooming.

For example, according to an embodiment, the pin and the ball can be in point contact in the y-axis direction by designing the camera module in consideration of the attraction of the magnetic force between the magnet mounted on the lens assembly and the yoke disposed on the base. Through this, according to the embodiment, there is a technical effect of minimizing decenter or tilting of the lens during zooming by increasing the precision of lens alignment by controlling the assembly tolerance below the limit level of the related art.

In addition, according to the embodiment, the center portion of the lens unit in the y-axis direction can be inhibited by the guide groove of the protrusion, and thus there is a technical effect of solving the problem of lens tilting during zooming.

Accordingly, according to the embodiment, there is a complex technical effect that can significantly improve image quality or resolution by inhibiting lens decenter or lens tilt while minimizing friction torque during zooming.

Next, according to the embodiment, there is a technical effect that the zooming function can be smoothly performed even in the compact camera module.

For example, according to the embodiment, the yoke and the coil, which are driving units, may be disposed under the base to reduce the area occupied by the driving units, thereby enabling a technical implementation of a compact camera module.

The technical effects of the embodiments are not limited to those described in this section, but include those that can be recognized from the description of this invention.

MODE FOR INVENTION

Hereinafter, embodiments will be described in detail with reference to the accompanying drawings.

On the other hand, in the description of the embodiment, in the case where it is described as being formed in "up/down" or "above/below" of each element, includes both two components directly contacting each other, or one or more other configurations formed indirectly between the two configurations. In addition, when expressed as "up/down" or "above/below", it may include not only an up direction but a down direction based on one configuration.

Moreover, the relational terms such as "upper/upper portion/up" and "lower/lower portion/down", etc., used below, do not require or imply any physical or logical relationship or order between such components or elements, it may be used to distinguish one component or element from another component or element.

Also, in the description of the embodiment, terms such as "first" and "second" may be used to describe various components, but these terms are used for the purpose of distinguishing one component from another component. In addition, terms that are specifically defined in consideration of the configuration and operation of the embodiments are only intended to describe the embodiments, and do not limit the scope of the embodiments.

Example

Figure 1:
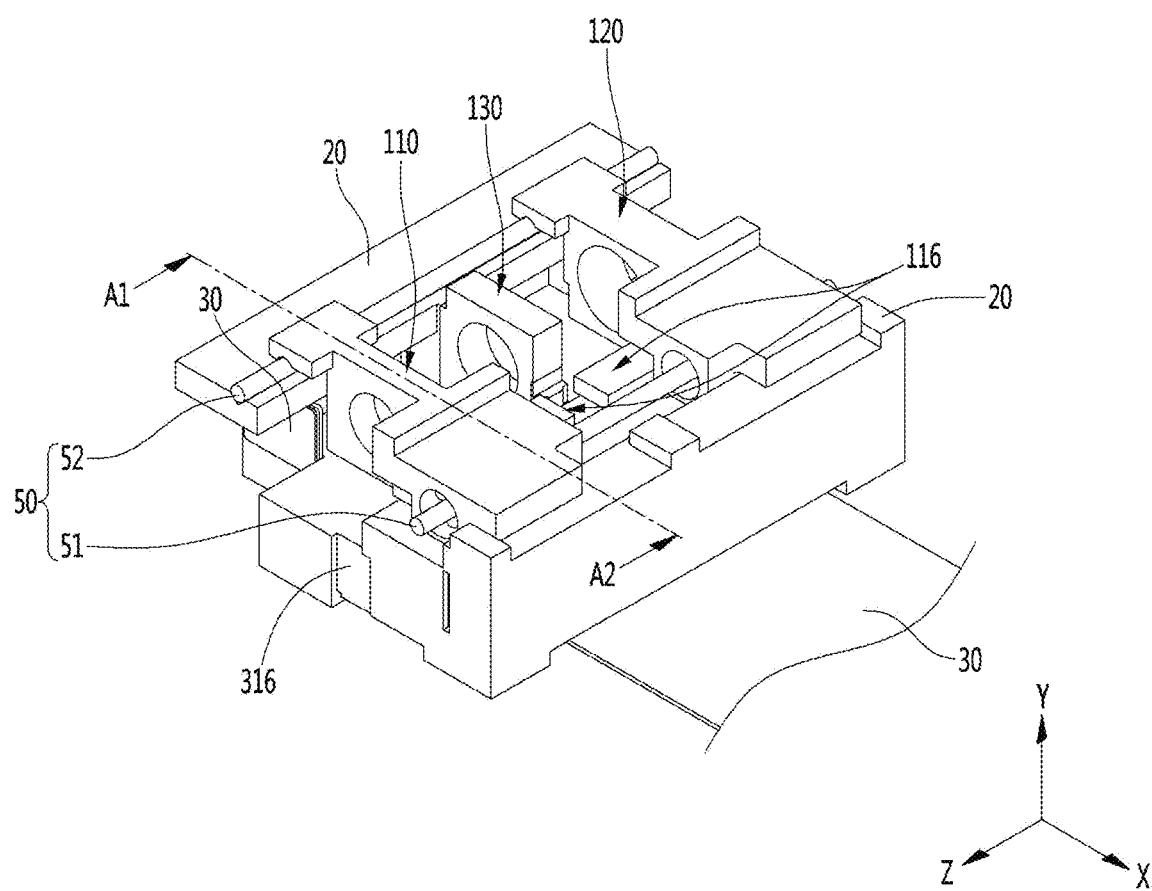
FIG. 1 is a perspective view of a lens driving device according to the embodiment.
Figure 2:
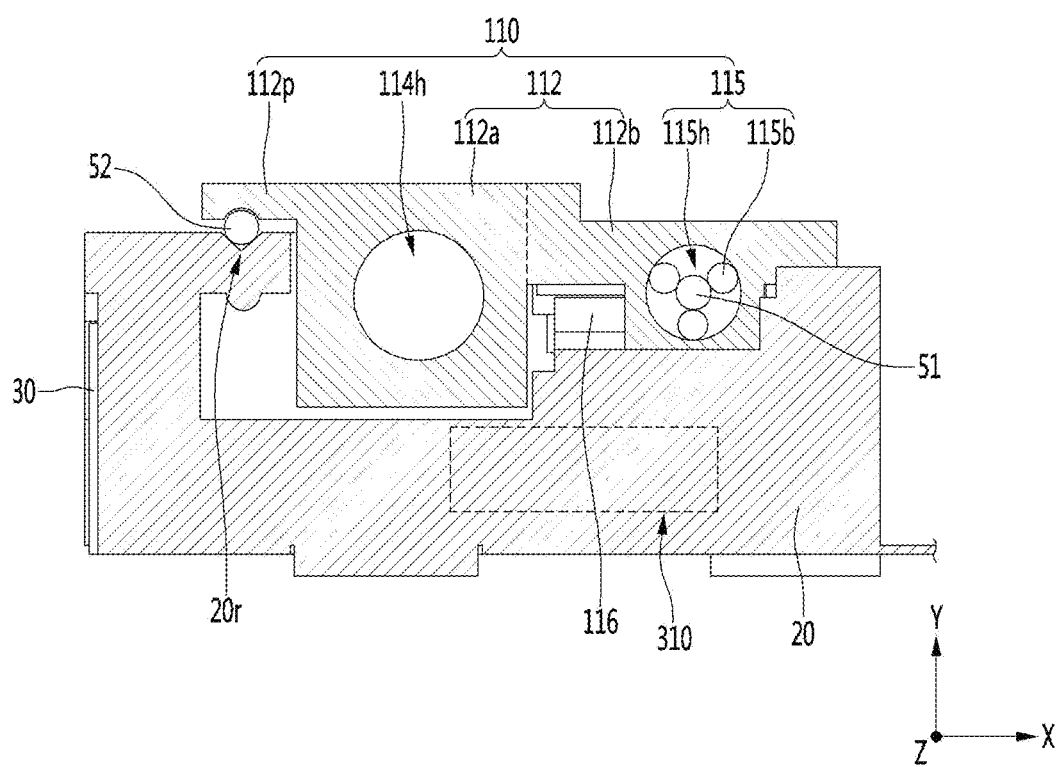
FIG. 2 is a cross-sectional view of the lens driving device according to the embodiment shown in FIG. 1.

FIG. 1 is a perspective view of a lens driving device according to an embodiment, and FIG. 2 is a cross-sectional view taken along line A1-A1' of the lens driving device according to the embodiment shown in FIG. 1.

In the xyz axis direction shown in FIGS. 1 and 2, the xz plane may represent the ground, the z axis means the optical axis direction or parallel thereto, and the x axis is perpendicular to the z axis in the ground (xz plane). Also, the y-axis may mean a direction perpendicular to the ground.

In the following description of the embodiment, two moving lens groups are described, but the present invention is not limited thereto. The moving lens group may be three, four, or five or more. In addition, the optical axis direction z may mean a direction that is the same as or parallel to the direction in which the lens groups are aligned.

First, referring to FIG. 1, in the camera module 100 according to the embodiment, various optical systems may be disposed on a predetermined base 20, and may be coupled to a lens cover (not shown) on one side of the base 20. For example, the lens cover may be coupled to each of the base side surfaces of the camera module 100 shown in FIG. 1 in the front direction and the rear direction. In addition, in an embodiment, an image sensor unit (not shown) may be disposed on the base side surface of the camera module 100 in the rear direction. The base 20 may be referred to as a mount or a case.

The material of the base 20 may be formed of any one or more of plastic, glass-based epoxy, polycarbonate, metal, or composite material.

The lens cover may be fitted to the base 20 by shape fitting or adhesive.

In addition, the base 20 and the lens cover may be combined with the pin 50.

In an embodiment the pin 50 may be referred to as a rod or shaft.

The fin 50 may include a first fin 51 and a second fin 52 that are spaced apart from and parallel to the optical axis. One side of the first pin 51 and the second pin 52 may be fixed to the lens cover and the other side of the first pin 51 and the second pin 52 may be fixed to the base 20.

In the camera module 100 according to the embodiment, an optical system and a lens driver may be disposed on the base 20. In addition, a circuit board 30 may be disposed below or on the side of the base 20 to be electrically connected to lens driving units inside the base 20.

For example, as shown in FIG. 1, the camera module 100 of the embodiment includes a first lens assembly 110, a second lens assembly 120, a third lens group 130, and a prism (not shown) in the base 20.

The first lens assembly 110, the second lens assembly 120, the third lens group 130, the prism, the image sensor unit, and the like may be classified as an optical system.

In addition, the embodiment may include a first driver 310 having a coil and a yoke (see FIG. 2), and the first driver 310, the pin 50, and the like may be classified as a lens driver. The first lens assembly 110 and the second lens assembly 120 may also have a function of a lens driver.

First, the optical system will be described. In an embodiment, the prism may change incident light into parallel light. For example, the prism changes the optical path of the incident light to an optical axis (z-axis) parallel to the central axis of the lens group to change the incident light to parallel light. Thereafter, the parallel light passes through the first lens assembly 110, the third lens group 130, and the second lens assembly 120, and enters the image sensor unit so that an image may be captured.

The prism may be an optical member having a triangular prism shape. Embodiments may also employ reflectors or reflective mirrors instead of or in addition to prisms.

In addition, the embodiment may include an additional prism (not shown) for the light passing through the lens group to be imaged by the image sensor unit when the image sensor unit is not disposed in the direction perpendicular to the optical axis.

In an embodiment, the image sensor may be disposed perpendicular to the optical axis direction of the parallel light. The image sensor unit may include a solid-state imaging device disposed on a predetermined second circuit board (not shown). For example, the image sensor unit may include a Charge Coupled Device (CCD) image sensor or a Complementary Metal-Oxide-Semiconductor (CMOS) image sensor.

In the embodiment, the first lens assembly 110 or the second lens assembly 120 may be a magnet driving unit having a magnet 116, but is not limited thereto. For example, the magnet 116 may include a permanent magnet. The first lens assembly 110 or the second lens assembly 120 of the embodiment may be driven by an electromagnetic force between the magnet 116 and the coil part of the first driving unit 310 disposed on the base 20, and can be moved back and forth parallel to the optical axis direction.

In addition, the embodiment may include a Hall sensor 316 below the base 20 to improve reliability of position measurement of the lens.

Referring to FIG. 1, the camera module according to the embodiment may perform a zooming function. For example, in an embodiment the first lens assembly 110 and the second lens assembly 120 are moving lenses moving through the first driver 310 (see FIG. 2) and the pin 50. The third lens group 130 may be a fixed lens.

For example, in an embodiment, the first lens assembly 110 and the second lens assembly 120 may be a moving lens group, and the third lens group 130 may be a fixed lens group, but is not limited thereto.

Next, the camera module according to the embodiment will be described in more detail with reference to FIG. 2. FIG. 2 is a cross-sectional view taken along line A1-A1' of the lens driving device according to the embodiment shown in FIG. 1.

Referring to FIG. 2, the lens driving apparatus 100 according to the embodiment includes a base 20, a pin 50 coupled to the base 20, and a first housing 112 equipped with lens group and moved along the pin 50 in the optical axis direction.

For example, in the embodiment, the first lens assembly 110 may include a first housing 112, a first lens group 114 (see FIG. 3), and a ball accommodation part 115. The first lens assembly 110 may include a magnet 116 mounted under the first housing 112. The first lens assembly 110 can be moved back and forth in z direction parallel to the optical axis direction by an electromagnetic force generated by interaction with the magnet 116 and the first driving unit 310 disposed on the base 20 and can be guided by the pin 50.

First, the first housing 112 may include a first lens housing 112a and a first driver housing 112b. For example, the first housing 112 includes a first lens housing 112a in which the first lens group 114 is accommodated, and a first driver housing 112b including the magnet 116 and the ball accommodation part 115.

The first lens housing 112a may be provided with a first lens group disposition region 114h in which the first lens group 114 is disposed.

In particular, the embodiment may include a ball accommodation part 115 and a plurality of balls 115b disposed in the ball accommodation part 115 inside the first driving unit housing 112b. The pin 50 may be disposed in the ball accommodation part 115 to guide the first housing 112 while contacting the plurality of balls 115b.

The pin 50 may be disposed one or more parallel to the optical axis (z axis). For example, the pin 50 may include a first pin 51 and a second pin 52 spaced apart in parallel to the optical axis direction, and may be a movement guide function for the first lens assembly 110 and the second lens assembly 120. The fin 50 may be formed of any one or more of plastic, glass-based epoxy, polycarbonate, metal, or composite materials.

The embodiment may include a first protrusion 112p extending from the first lens housing 112a in a direction opposite to the x-axis, and a first guide groove (not shown) may be provided in the first protrusion 112p. In this case, the second pin 52 may be disposed in the first guide groove to guide the movement of the first lens assembly 110.

In addition, the base 20 may include a first recess 20r corresponding to the shape of the second pin 52 to firmly fix the second pin 52.

According to the embodiment, the center of the lens unit in the y-axis direction can be inhibited by the first guide groove of the first protrusion 112p and the first recess 20r of the base, so that there is a technical effect to solve the problem of occurrence of the lens tilts during zooming.

Figure 3:
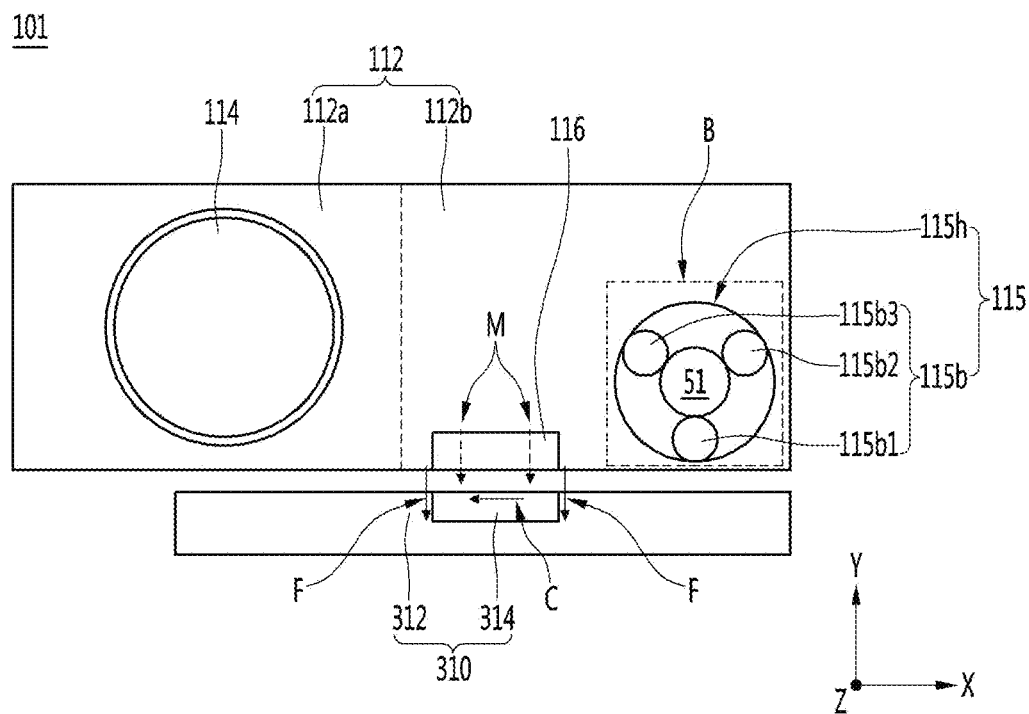
FIG. 3 is a cross-sectional view of the lens driving device according to the first embodiment.

FIG. 3 is a cross-sectional view of the lens driving device 101 according to the first embodiment.

The lens driving device 101 according to the first embodiment includes a base 20, a first pin 51 and a first lens group 114 coupled to the base 20, and a first housing 112 equipped with lens group and moved along the first pin 51 in the optical axis direction.

As described above, the first housing 112 may include a first lens housing 112a and a first driver housing 112b.

The first lens housing 112a functions as a barrel, and the first lens group 114 may be mounted. The first lens group 114 may be a moving lens group, and may include a single lens or a plurality of lenses.

Next, a first magnet 116 may be disposed in the first driver housing 112b, and the first magnet 116 may be a magnet driver, but is not limited thereto. For example, the first magnet 116 may include a permanent magnet, but is not limited thereto.

In the camera module according to the embodiment, an electromagnetic force may be generated by interaction between the first magnet 116 mounted on the first driver housing 112b and the first driver 310, and a driving force may be applied to the first housing 112.

The first driving part 310 may include a first yoke 312 and a first coil part 314 disposed on the first yoke 312.

The first magnet 116 may be magnetized to face the first coil part 314. Accordingly, the north pole and the south pole of the first magnet 116 may be disposed so that the current C in the first coil part 314 may correspond to a region flowing in a direction parallel to the x axis on the ground.

For example, in the embodiment where the direction of the magnetic force (M) of the first magnet 116 has a direction opposite to the y-axis, if the current (C) flows in the direction opposite to the x-axis in the first coil part 314 according to the Fleming left hand law, the electromagnetic force can be applied in the opposite direction of the z axis. The electromagnetic force may be controlled in proportion to the current applied to the first coil part 314.

Similarly, in the camera module according to the embodiment, the second lens assembly 120 may move parallel to the optical axis through electromagnetic force.

One of the technical problems of the embodiment is to provide a lens driving device and a camera module including the same, which can inhibit friction torque generation during lens movement through zooming in the camera module.

In order to solve this technical problem, in the first embodiment, the first housing 112 has a plurality of balls 115b disposed inside of the ball accommodating part 115.

At this time, the first pin 51 is disposed in the ball accommodation part 115 to contact the plurality of balls 115b and guide the first housing 112 to parallel the first lens assembly 110 to the optical axis.

For example, the first housing 112 may include a ball accommodation part 115 inside the first driving unit housing 112b, and the ball accommodation part 115 may have a predetermined first ball accommodation hole 115h. And a plurality of balls 115b may be disposed in the first ball accommodation hole 115h.

For example, a first ball 115b1, a second ball 115b2, and a third ball 115b3 may be disposed in the first ball accommodation hole 115h, but is not limited thereto.

The plurality of balls 115b may be formed of any one or more of ceramic, plastic, glass-based epoxy, polycarbonate, metal, or a composite material, but is not limited thereto.

The plurality of balls 115b may be formed in a spherical shape, but is not limited thereto.

According to an embodiment, the first lens assembly 110 moves along the first pin 51, and accommodates the first ball inside the first lens assembly 110, for example, inside the first drive housing 112b. The first pin 51 is in contact with the balls 115b, thereby minimizing friction torque, thereby improving the driving force, reducing power consumption, and improving control characteristics.

Accordingly, the lens driving device and the camera module including the same according to the embodiment have a technical effect of solving the problem of friction torque generation during zooming.

Next, one of the technical problems of the embodiment is to provide a lens driving device and a camera module including the same, which can inhibit the lens decenter or lens tilt when the lens moves through the zooming in the camera module.

According to an embodiment, the attraction force F may act between the first yoke 312 of the first driver 310 and the magnet 116 mounted to the first driver housing 112b.

In the embodiment, the camera module may be designed in consideration of the attractive force F according to the magnetic force between the magnet 116 mounted on the first lens assembly 110 and the first yoke 312 disposed on the base 20, and the first pin 51 of embodiment may be in point contact with the plurality of balls 115b such that the assembly tolerance can be controlled below the limit level of the prior art. Accordingly, the embodiment has a technical effect of minimizing decenter or tilting of the lens during zooming by increasing the precision of lens alignment.

Therefore, according to the embodiment, there is a technical effect that can solve the problem of lens decenter or tilt when zooming.

According to the embodiment, there is a complex technical effect that can significantly improve image quality or resolution by minimizing friction torque while inhibiting zooming or lens tilt.

In addition, one of the technical problems of the embodiment is to provide a driving device and a camera module including the same, which can perform a zooming function smoothly even in a compact and compact camera module.

According to the embodiment, the first yoke 312 and the first coil part 314, which are the first driving unit 310, are disposed under the base 20 to reduce the area occupied by the driving unit, thereby enabling the implementation of a compact camera module. According to the embodiment, there is a technical effect that the zooming function can be smoothly performed even in the compact camera module.

Figure 4:
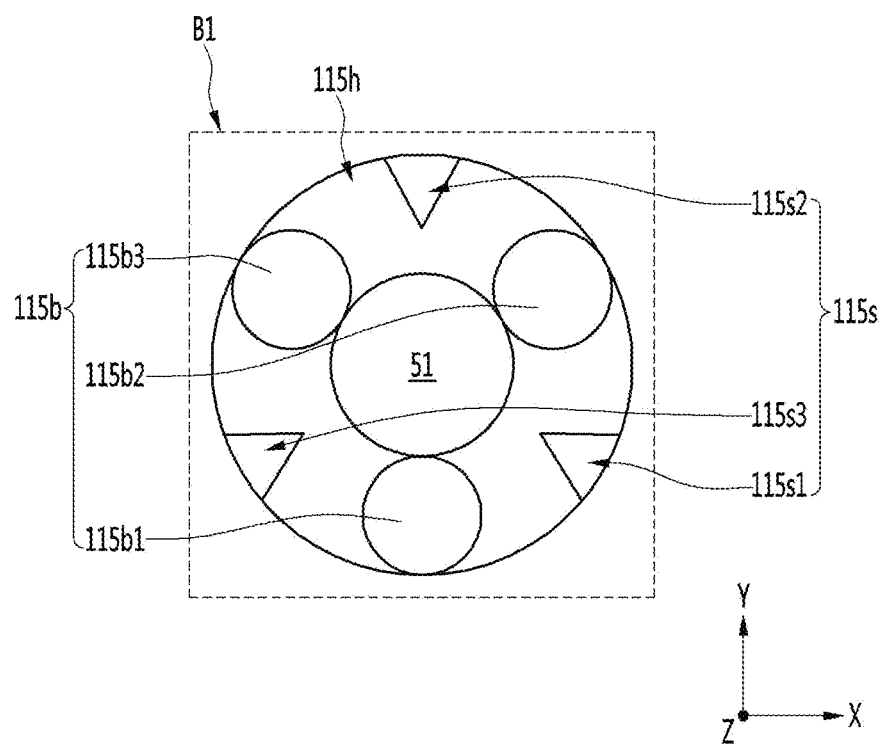
FIG. 4 is an exemplary view of a first ball accommodation part B1 of a lens driving device according to the first embodiment shown in FIG. 3.

Next, FIG. 4 is a first embodiment B1 of the ball accommodation part 115 of the lens driving device 101 according to the first embodiment shown in FIG. 3. The first ball accommodating part B1 may correspond to the first area B including the ball accommodating part 115 illustrated in FIG. 3.

Referring to FIG. 4, in an embodiment, the first ball accommodation part B1 may include a first ball accommodation hole 115h, and a plurality of balls 115b may be disposed in the first ball accommodation hole 115h. For example, a first ball 115b1, a second ball 115b2, and a third ball 115b3 may be disposed in the first ball accommodation hole 115h, but is not limited thereto.

In an embodiment, the first ball accommodation part B1 may include a blocking part 115s between the plurality of balls 115b.

In one embodiment, the blocking part 115s may be provided in a single or plural number, and may include, for example, a first blocking part 115s1, a second blocking part 115s2, and a third blocking part 115s3.

For example, the blocking part 115s includes a first blocking part 115s1 disposed between the first ball 115b1 and the second ball 115b2, a second blocking part 115s2 disposed therebetween the second ball 115b2 and the third ball 115b3, and the third blocking part 115s3 between the third ball 115b3 and the first ball 115b1, but are not limited thereto.

The blocking part 115s may be formed of the same material as the material of the first driving part housing 112b or another material. The cross-sectional shape of the blocking part 115s may be polygonal, but is not limited thereto. Balls 115b may be disposed between the blocking parts 115s in a single or plural number.

In an embodiment, the first ball accommodation part B1 includes a blocking part 115s between the plurality of balls 115b to inhibit movement between the balls 115b to inhibit lens decentering during zooming. Also, there is a technical effect to solve the problem of tilting.

Figure 5A:
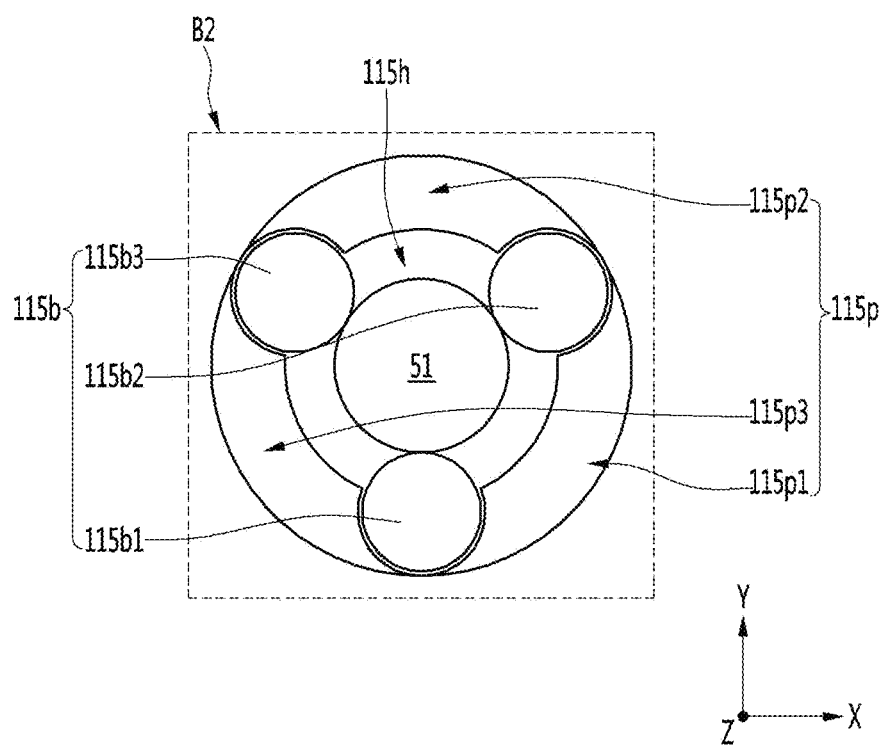
FIGS. 5A, 5B and 5C are exemplary views of the second ball accommodation part B2 of the lens driving device according to the first embodiment.
Figure 5B:
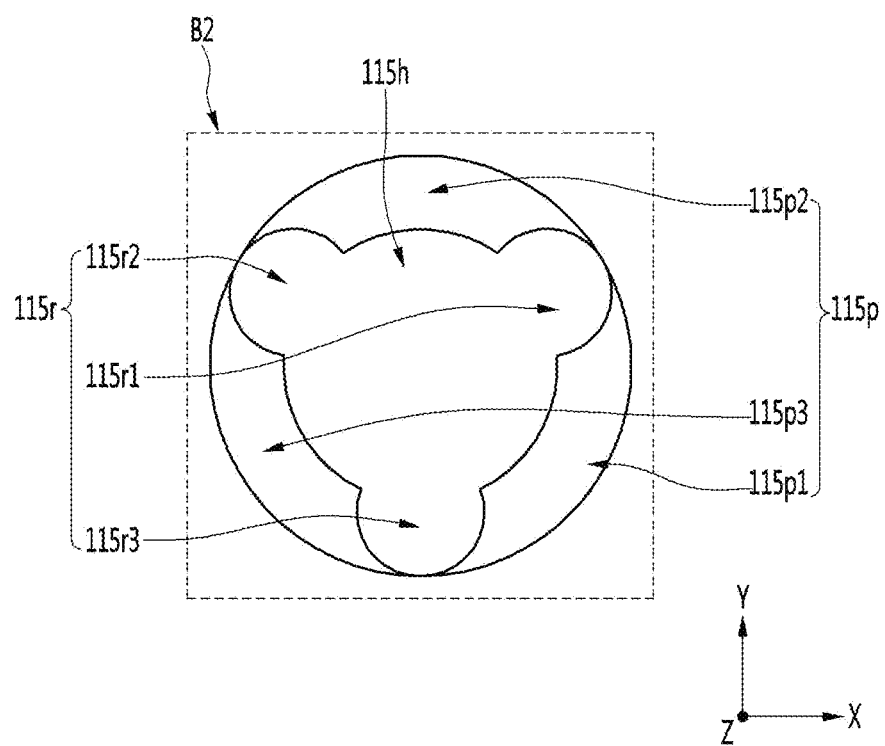
Figure 5C:
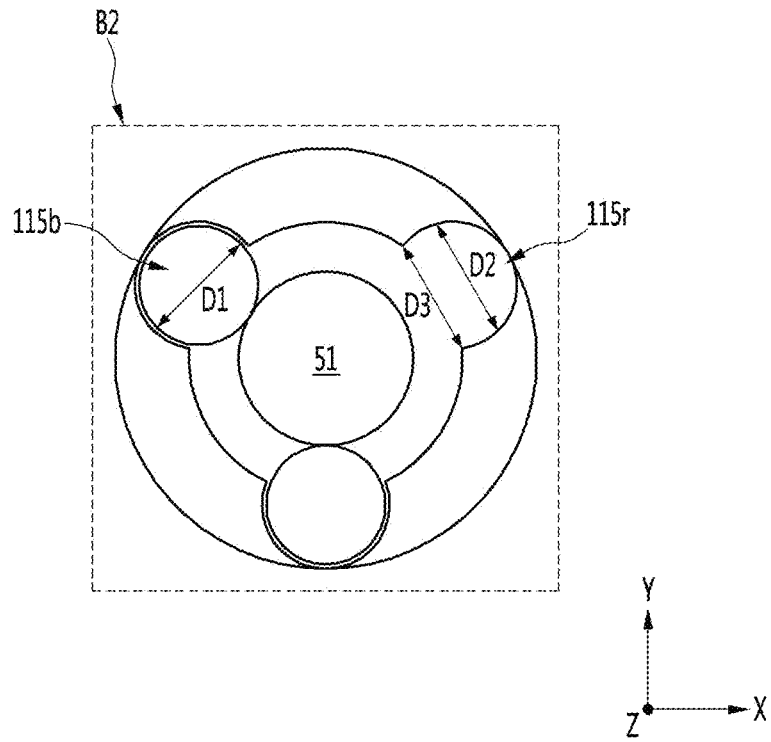

FIGS. 5A, 5B and 5C are exemplary views of the second ball accommodating part B2 of the lens driving device according to the first embodiment.

Referring to FIG. 5A, in an embodiment, the second ball accommodation part B2 may include a first ball accommodation hole 115h, and a plurality of balls 115b may be disposed in the first ball accommodation hole 115h. For example, a first ball 115b1, a second ball 115b2, and a third ball 115b3 may be disposed in the first ball accommodation hole 115h, but is not limited thereto.

In particular, the second ball accommodation part B2 may include a plurality of ball guide rails 115p between the plurality of balls 115b.

For example, the second ball accommodation part B2 may include a first ball guide rail 115p1, a second ball guide rail 115p2, and a third ball guide rail 115p3 between the plurality of balls 115b.

For example, the second ball accommodation part B2 may include a first ball guide rail 115p1 disposed between the first ball 115b1 and the second ball 115b2, and a second ball guide rail 115p2 disposed between the second ball 115b2 and the third ball 115b3 and a third ball guide rail 115p3 disposed between the third ball 115b3 and the first ball 115b1.

The ball guide rail 115p may be formed of the same material as the material of the first driving unit housing 112b or another material.

According to the embodiment, a plurality of ball guide rails 115p are provided in the second ball accommodation part B2, so that the plurality of balls 115b are guided in the ball guide rails 115p and can make point contact with the first pin 51, thereby having a technical effect to solve the problem of lens decenter or tilt during zooming.

In addition, according to the embodiment, the lens assembly is moved along the first pin 51, the second ball accommodation part (B2) is provided in the lens assembly, the ball guide rail (115p) in the second ball accommodation part (B2) by placing the first pin 51 in contact with the ball (115b) to minimize the friction torque there is a technical effect, such as improved driving force, reduced power consumption and improved control characteristics.

Next, FIG. 5B is a view in which the first pin 51 and the ball 115b are removed from the second ball accommodation part B2 of the lens driving device according to the first embodiment shown in FIG. 5A. FIG. 5C is a detailed view of the diameter of the first pin 51 and the ball guide groove 115r.

Referring to FIG. 5B, the ball guide groove 115r may be provided in singular or plural by the ball guide rails 115p in the embodiment.

For example, an embodiment includes a first ball guide groove 115r1 between a first ball guide rail 115p1 and a second ball guide rail 115p2. The second ball guide groove 115r2 may be included between the third ball guide rail 115p3 and the second ball guide rail 115p2. The third ball guide groove 115r3 may be included between the third ball guide rail 115p3 and the first ball guide rail 115p1.

The first ball 115b1 to the third ball 115b3 may be disposed on each of the first ball guide rails 115p1 to third ball guide rails 115p3.

According to the embodiment, the ball guide rail 115p is provided in the second ball accommodation part B2 and the ball guide groove 115r is provided between the ball guide rails 115p, whereby the plurality of balls 115b are formed. Since each ball is guided by guide rail 115p and may be in point contact with the first pin 51, there is a technical effect that can solve the problem of lens decenter or tilting during zooming.

Next, referring to FIG. 5C, the ball 115b may have a first diameter D1, the ball guide groove 115r may have a second diameter D2, and the second diameter D2 of the ball guide groove 115r is designed to be larger than the first diameter D1 of the ball 115b so that the ball 115b is disposed in the ball guide groove 115r and guided.

Accordingly, the ball guide groove 115r may have an open area in the direction of the first pin 51, and the third gap D3 of the open area may be smaller than the diameter D1 of the ball 115b.

That is, in the embodiment, the third gap D3 of the open area in the ball guide groove 115r is smaller than the first diameter D1 of the ball 115b, so that the ball 115b is formed in the ball. The point contact with the first pin 51 while being firmly guided without deviating from the guide groove 115r has a technical effect of solving the problem of lens decenter or tilt during zooming.

The ball 115b is inserted into the ball guide groove 115r in the z-axis direction, and there is a technical effect that the ball 115b is not separated in the x-axis direction or the y-axis direction.

Figure 6:
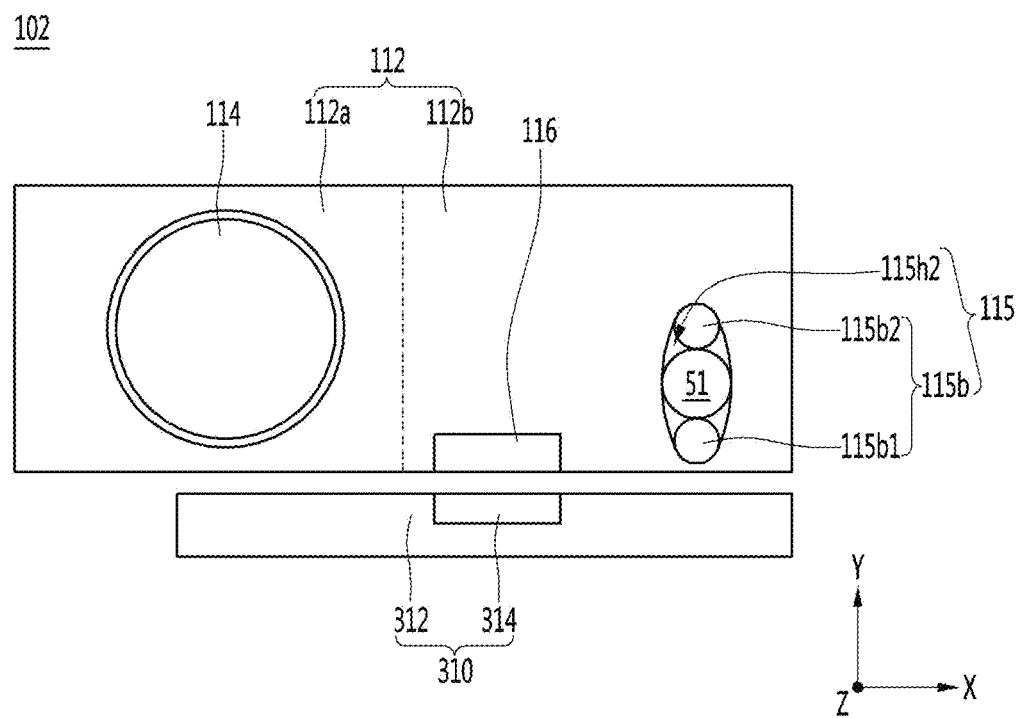
FIG. 6 is a sectional view of a lens driving device according to the second embodiment.

FIG. 6 is a sectional view of the lens driving device 102 according to the second embodiment.

The second embodiment can employ the technical features of the first embodiment.

For example, the lens driving device 102 according to the second embodiment includes a base 20, a first pin 51 and a first lens group 114 coupled to the base 20. The first housing 112 may be moved along the first pin 51 in the optical axis direction. The first housing 112 may include a first lens housing 112a and a first driver housing 112b.

In the camera module according to the second embodiment, electromagnetic force is generated by the interaction between the first magnet 116 mounted on the first driver housing 112b and the first driver 310, and the driving force is applied to the first housing 112. The first driving part 310 may include a first yoke 312 and a first coil part 314 disposed on the first yoke 312.

Hereinafter, the main features of the second embodiment will be described.

One of the technical problems of the embodiment is to provide a lens driving device and a camera module including the same capable of inhibiting lens decenter or lens tilt from occurring when a lens moves through zooming in a camera module.

In the second embodiment, the ball accommodation part 115 may include a second ball accommodation groove 115h2 having an elliptical cross section, and the plurality of balls 115b may be disposed above and below the first pin 51, respectively.

Further, according to the embodiment, the attraction force F (see FIG. 3) may incur between the first yoke 312 of the first driver 310 and the magnet 116 mounted to the first driver housing 112b.

Accordingly, according to the embodiment, the second ball accommodation groove is caused by the attraction force F according to the magnetic force between the magnet 116 mounted on the first lens assembly 110 and the first yoke 312 disposed on the base 20. The first and second balls 115b1 and 115b2 disposed at the lower side and the upper side of the 115h2, respectively, are stably positioned and brought into point contact with the first pin 51, thereby lowering the assembly tolerance below the limit of the prior art. This has the technical effect of minimizing lens decentering while zooming by increasing the accuracy of lens alignment.

Figure 7A:
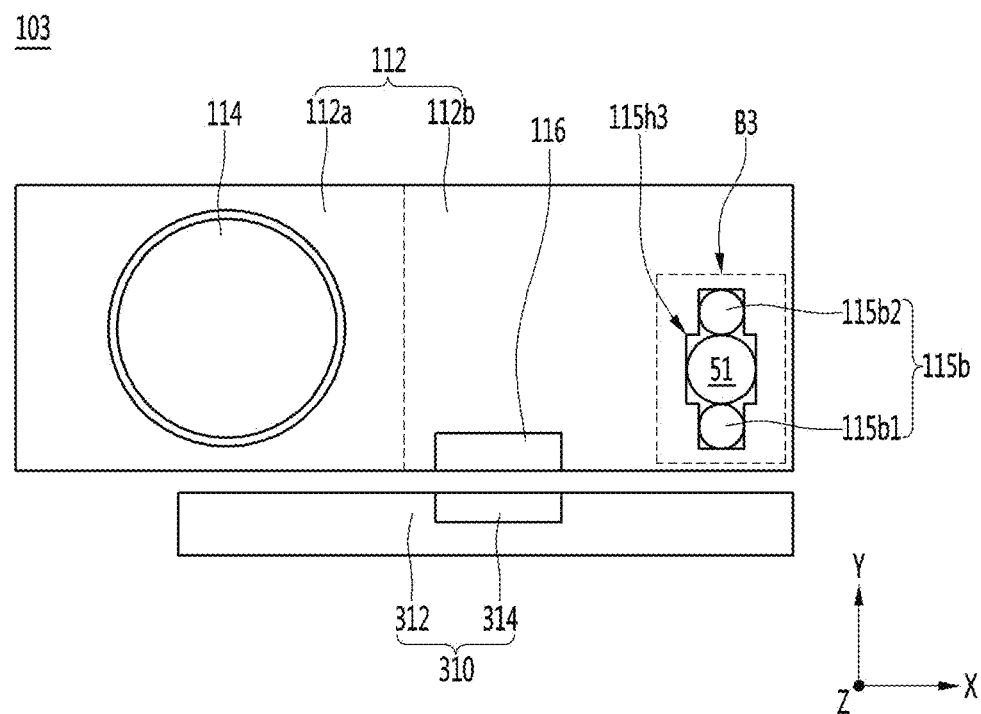
FIG. 7A is a sectional view of the lens driving device according to the third embodiment.

Next, FIG. 7A is a sectional view of the lens driving device 103 according to the third embodiment.

The third embodiment can employ the technical features of the first embodiment or the second embodiment.

For example, the lens driving device 103 according to the third embodiment may include a base 20, a first pin 51, and a first housing 112 which is moved in the optical axis direction along the first pin 51. The first housing 112 may include a first lens housing 112a, a first lens group 114, and a first driver housing 112b.

In the camera module according to the third embodiment, electromagnetic force is generated by the interaction between the first magnet 116 mounted on the first driver housing 112b and the first driver 310, and the driving force is applied to the first housing 112. The first driving part 310 may include a first yoke 312 and a first coil part 314 disposed on the first yoke 312.

Hereinafter, the main features of the third embodiment will be described.

In the third embodiment, a plurality of balls 115b may be disposed on the upper and lower sides of the first pin 51 in the third ball accommodation groove 115h3, respectively.

Figure 7B:
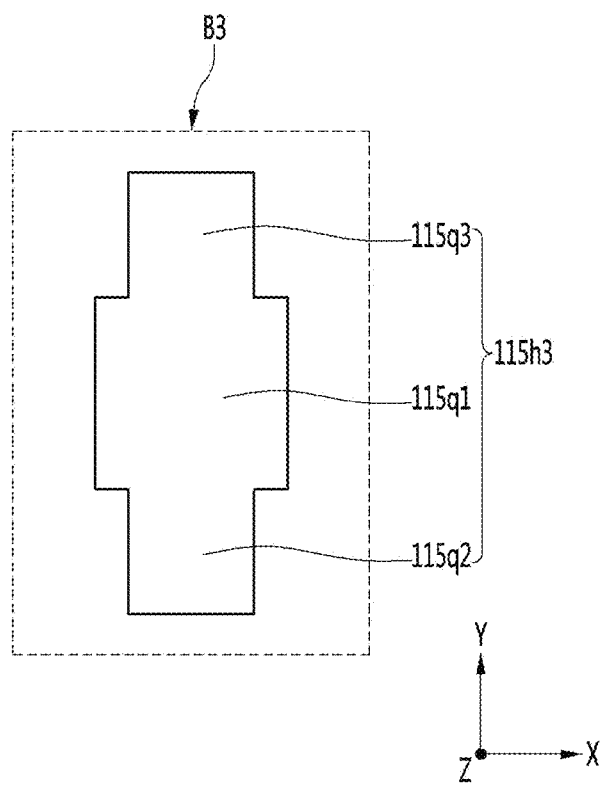
FIG. 7B is an exemplary view of a third ball accommodation part B3 of the lens driving device according to the third embodiment shown in FIG. 7A.

FIG. 7B is an exemplary view of the third ball accommodation part B3 of the lens driving device 103 according to the third embodiment shown in FIG. 7A.

In a third embodiment, the third ball accommodation part B3 may have a guide trench 115q. For example, the guide trench 115q may include a first guide trench 115q1 in which the first pin 51 is disposed, a second guide trench 115q2 in which the first ball 115b1 is disposed and may include a third guide trench 115q3 in which a second ball is disposed therein.

According to the embodiment, by providing the guide trench 115q in the third ball accommodation part B3, the first pin 51 is in point contact or line contact at the side of the third ball accommodation part B3 to minimize the friction torque. As a result, there are technical effects such as improved driving force, reduced power consumption, and improved control characteristics.

Further, according to the third embodiment, the third ball accommodation part B3 can have the attraction force F according to the magnetic force between the magnet 116 and the first yoke 312 mounted on the first housing 112. The assembly tolerance is conventionally established by bringing the first ball 115b1 and the second ball 115b2 disposed in the guide trench 115q2 and the third guide trench 115q3 into point contact with the first pin 51 while being stably positioned. It can be controlled below the limit level of technology. This has the technical effect of minimizing lens centering or zooming when zooming by increasing the accuracy of lens alignment.

Figure 8A:
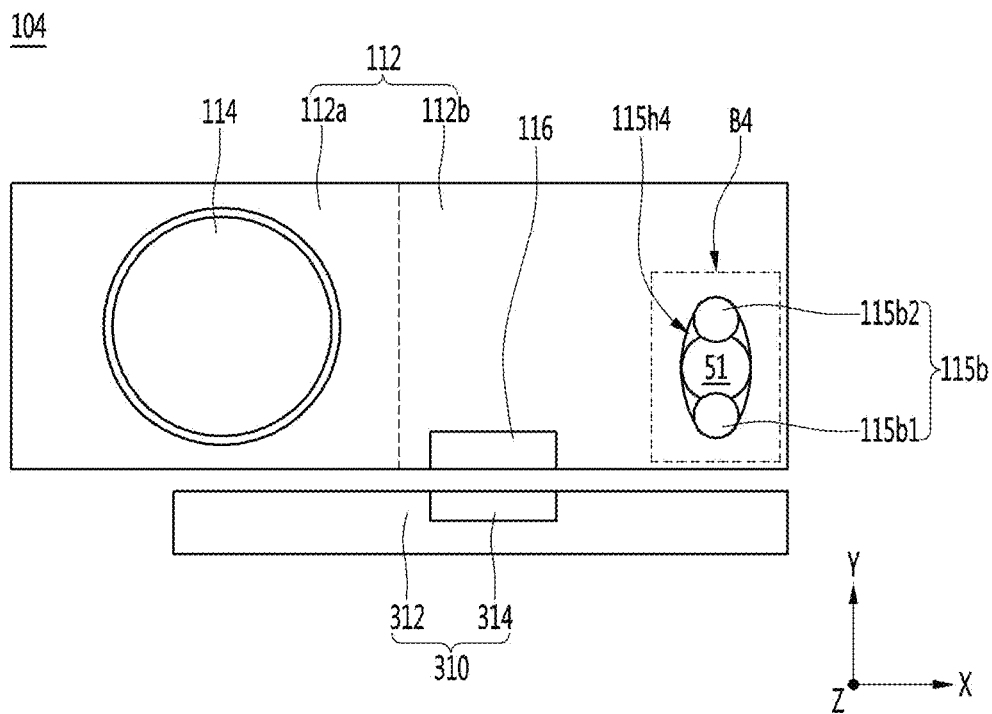
FIG. 8A is a sectional view of a lens driving device according to a fourth embodiment.

FIG. 8A is a sectional view of the lens driving device 104 according to the fourth embodiment.

The fourth embodiment can employ the technical features of the first to third embodiments.

For example, the lens driving device 104 according to the fourth embodiment may include a first housing 112 that moves in the optical axis direction along the first pin 51. The first housing 112 may include a first lens housing 112a, a first lens group 114, and a first driver housing 112b.

In the camera module according to the fourth embodiment, electromagnetic force is generated by interaction between the first magnet 116 mounted on the first driver housing 112b and the first driver 310 to apply a driving force to the first housing 112. The first driving part 310 may include a first yoke 312 and a first coil part 314 disposed on the first yoke 312.

Hereinafter, the main features of the fourth embodiment will be described.

In the fourth embodiment, the fourth ball accommodation part B4 may include a fourth ball accommodation groove 115h4 having an elliptical cross section, and the plurality of balls 115b may be arranged upper and lower sides of the first pin 51 respectively.

Further, according to the embodiment, the attraction force F (see FIG. 3) may incur between the first yoke 312 of the first driver 310 and the magnet 116 mounted to the first driver housing 112b.

Accordingly, according to the embodiment, the fourth ball accommodation groove is formed by the attraction force F according to the magnetic force between the magnet 116 mounted on the first housing 112 and the first yoke 312 disposed on the base 20. The assembly tolerance is controlled to be below the limit level of the prior art by bringing the first ball 115b1 and the second ball 115b2 disposed on the lower side and the upper side of the 115h2, respectively, and in point contact with the first pin 51 while being stably positioned. This has the technical effect of minimizing lens centering or zooming when zooming by increasing the accuracy of lens alignment.

Figure 8B:
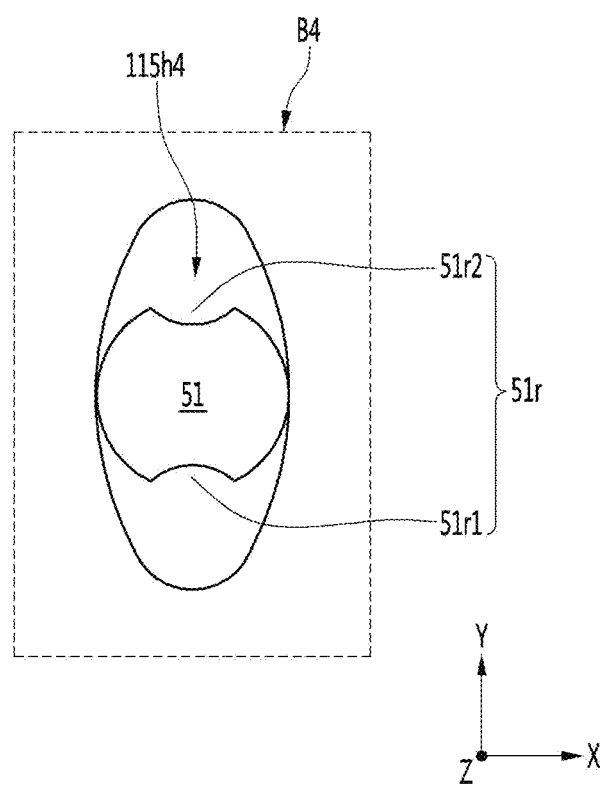
FIG. 8B is an exemplary view of a fourth ball accommodation part B4 of the lens driving device according to the fourth embodiment shown in FIG. 8A.

FIG. 8B is an exemplary view of a fourth ball accommodation part B4 of the lens driving device 104 according to the fourth embodiment shown in FIG. 8A.

In the fourth embodiment, the first pin 51 may include a curved recess 51r corresponding to the shape of the ball 115b at an upper side or a lower side thereof.

For example, the first pin 51 corresponds to the shape of the first curved recess 51r1 corresponding to the shape of the first ball 115b1 on the lower side and the shape of the second ball 115b2 to the upper side. It may include a second curved recess 51r2.

According to the fourth embodiment, the upper and lower sides of the first fin 51 include a curved recess 51r corresponding to the shape of the ball 115b, so that the ball 115b can be stably disposed within the curved recess 51r of a fourth ball accommodation groove 115h2. So, there is a technical effect of minimizing decenter or lens tilt during zooming by increasing the accuracy of lens alignment.

Figure 9:
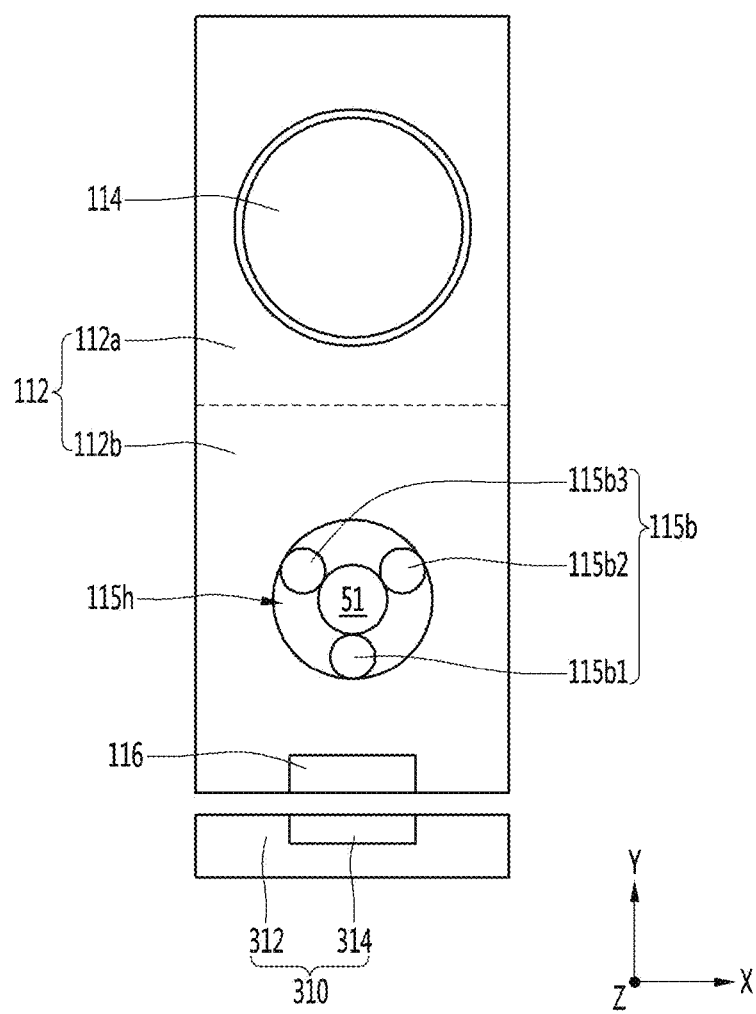
FIG. 9 is a sectional view of a lens driving device according to a fifth embodiment.

FIG. 9 is a cross-sectional view of the lens driving device 105 according to the fifth embodiment.

The fifth embodiment can employ the technical features of the first to fourth embodiments.

Hereinafter, the main features of the fifth embodiment will be described.

In the lens driving device 105 according to the fifth embodiment, the ball accommodation part 115 may be disposed under the first lens portion 114.

For example, the lens driving device 105 according to the fifth embodiment may include a first housing 112 moved along the first pin 51 in the optical axis direction. The first housing 112 may include a first lens housing 112a and a first driver housing 112b. The first lens group 114 may be disposed in the first lens housing 112a.

In the fifth embodiment, the first lens housing 112a and the first driver housing 112b may be disposed up and down. For example, the first lens housing 112a and the first driver housing 112b may be disposed parallel to the y-axis direction.

In the fifth embodiment, the ball accommodation part 115 may be disposed in the first driving unit housing 112b, and the first pin 51 and the plurality of balls 115b may be disposed in the ball accommodation part 115.

In the camera module 105 according to the fifth embodiment, an electromagnetic force is generated by the interaction between the first magnet 116 mounted on the first driver housing 112b and the first driver 310, and a driving force is applied to the first housing 112. The first driving part 310 may include a first yoke 312 and a first coil part 314 disposed on the first yoke 312.

According to the fifth embodiment, since the first housing 112 can be stably driven while having one first pin 51, a compact camera module can be implemented.

In addition, according to the fifth embodiment, since the first lens unit 114 and the ball accommodation part 115 are aligned up and down, the center of the first lens unit 114 can be inhibited from shifting, so that there is a technical effect that can solve the problem of lens tilts while zooming.

In addition, according to the fifth embodiment, the lens assembly is moved along the first pin 51, the point of contact between the ball 115b disposed in the ball accommodation part 115 and the first pin 51 can minimize friction torque. There are technical effects such as improved driving force, reduced power consumption, and improved control characteristics.

In addition, according to the fifth embodiment, by designing the camera module in consideration of the attraction force between the magnet 116 and the yoke 312 mounted on the lens assembly, the lens assembly is controlled by controlling the assembly tolerance below the limit of the prior art. There is a technical effect to minimize the decenter or lens tilt when zooming by increasing the precision of the camera.

INDUSTRIAL APPLICABILITY

The lens driving device and the camera module including the same according to the embodiment have a technical effect of solving the problem of friction torque generation during zooming.

In addition, according to the embodiment, there is a technical effect that can solve the problem of lens decenter or tilting during zooming.

In addition, according to the embodiment, the center portion of the lens unit in the y-axis direction can be inhibited by the guide groove of the protrusion, and thus there is a technical effect of solving the problem of lens tilting during zooming.

Accordingly, according to the embodiment, there is a complex technical effect that can significantly improve image quality or resolution by inhibiting decentralization or lens tilt by minimizing friction torque during zooming.

Next, according to the embodiment, there is a technical effect that the zooming function can be smoothly performed even in the compact camera module. For example, according to the embodiment, the yoke and the coil, which are driving units, may be disposed under the base to reduce the area occupied by the driving units, thereby enabling a technical implementation of a compact camera module.

Features, structures, effects, etc. described in the above embodiments are included in at least one embodiment, but are not necessarily limited to one embodiment. Furthermore, the features, structures, effects, and the like illustrated in the embodiments may be combined or modified with respect to other embodiments by those skilled in the art to which the embodiments belong. Therefore, it should be interpreted that the contents related to this combination and modification are included in the scope of the embodiments.

Although the above description has been made with reference to the embodiments, these are merely examples and are not intended to limit the embodiments, and those of ordinary skill in the art to which the embodiments pertain may have various examples that are not illustrated above without departing from the essential characteristics of the embodiments. It will be appreciated that eggplant modifications and applications are possible. For example, each component specifically shown in the embodiment can be modified. And differences relating to these modifications and applications will have to be construed as being included in the scope of the embodiments set forth in the appended claims.

DESCRIPTION OF THE DRAWING REFERENCES

Base 20; Pin 50; first lens assembly 110, second lens assembly 120,
third lens group 130, first housing 112, ball accommodation part 115, a plurality of balls 115b

The invention claimed is:
1. A lens driving device comprising:
a base;
a plurality of pins coupled to the base; and
a housing including a lens group and configured to move in an optical axis direction along the pins,
wherein the housing comprises a ball accommodation part and a plurality of balls disposed inside the ball accommodation part and surrounding a first pin of the pins,
wherein the first pin is disposed in the ball accommodation part to guide the housing while contacting the plurality of balls,
wherein the housing comprises a first housing including a first lens housing in which a first lens group is accommodated, and a first driver housing including a magnet and the ball accommodation part,
wherein the first housing includes a first protrusion extending from the first lens housing in a direction perpendicular to the optical axis direction, and a first guide groove provided in the first protrusion,
wherein the pins include a second pin disposed in the first guide groove to guide the movement of the first lens assembly,
wherein the base includes a first recess corresponding to a shape of the second pin,
wherein the lens driving device comprises a first driving part disposed below the first housing,
wherein the first driving part includes a first yoke and a first coil part disposed on the first yoke, and
wherein the first driving part is disposed between the first pin and the second pin.

2. The lens driving device according to claim 1, wherein there is attractive force between the first yoke and the magnet.

3. The lens driving device according to claim 1, wherein the ball accommodation part includes a predetermined first ball accommodation hole and the balls are disposed in the first ball accommodation hole.

4. The lens driving device according to claim 3, wherein the balls include a first ball, a second ball, and a third ball disposed in the first ball accommodation hole.

5. The lens driving device according to claim 1, wherein the first pin is a cylindrical pin having a circular cross-sectional shape.

6. The lens driving device according to claim 5, wherein the plurality of balls comprises three balls disposed around and in direct contact with a circumference of the circular cross-sectional shape of the first pin.

7. The lens driving device according to claim 5, wherein the ball accommodation part comprises a plurality of ball guide rails between the plurality of balls.

8. The lens driving device according to claim 7, wherein a ball guide groove is disposed between the ball guide rails.

9. The lens driving device according to claim 8, wherein the ball guide groove has an open area in a direction of the first pin, and a third gap of the open area is smaller than a diameter of one of the balls.

\* \* \* \* \*